US007340761B2

(12) United States Patent
Billmaier

(10) Patent No.: US 7,340,761 B2
(45) Date of Patent: Mar. 4, 2008

(54) SYSTEM AND METHOD FOR DELIVERING RADIO PROGRAMS AND RELATED SCHEDULE INFORMATION

(75) Inventor: James A. Billmaier, Woodinville, WA (US)

(73) Assignee: Digeo, Inc., Kirkland, WA (US)

( * ) Notice: Subject to any disclaimer, the term of this patent is extended or adjusted under 35 U.S.C. 154(b) by 1024 days.

(21) Appl. No.: 09/789,175

(22) Filed: Feb. 20, 2001

(65) Prior Publication Data

US 2004/0244042 A1 Dec. 2, 2004

(51) Int. Cl.
H04N 5/445 (2006.01)
H04N 7/173 (2006.01)
G06F 13/00 (2006.01)
G06F 3/00 (2006.01)

(52) U.S. Cl. .......................... 725/49; 725/39; 725/51; 725/109

(58) Field of Classification Search ................ 725/110, 725/39–55, 109; 709/219; 455/3.01, 3.02, 455/3.04, 3.06
See application file for complete search history.

(56) References Cited

U.S. PATENT DOCUMENTS

| 4,706,121 | A | 11/1987 | Young | 358/142 |
|---|---|---|---|---|
| 5,282,028 | A | 1/1994 | Johnson et al. | 358/86 |
| 5,353,121 | A | 10/1994 | Young et al. | 348/563 |
| 5,406,558 | A | 4/1995 | Rovira et al. | 370/77 |
| 5,479,266 | A | 12/1995 | Young et al. | 358/335 |
| 5,479,268 | A | 12/1995 | Young et al. | 358/335 |
| 5,532,754 | A | 7/1996 | Young et al. | 348/569 |
| 5,585,866 | A | 12/1996 | Miller et al. | 348/731 |
| 5,589,892 | A | 12/1996 | Knee et al. | 348/731 |
| 5,629,733 | A | 5/1997 | Youman et al. | 348/7 |
| 5,727,060 | A | 3/1998 | Young | 380/10 |
| 5,809,204 | A | 9/1998 | Young et al. | 386/83 |
| 5,870,150 | A | 2/1999 | Yuen | 348/553 |
| 5,886,746 | A | 3/1999 | Yuen et al. | 348/564 |
| 5,940,073 | A | 8/1999 | Klosterman et al. | 345/327 |
| 5,940,391 | A * | 8/1999 | Malkin et al. | 370/390 |
| 5,970,206 | A | 10/1999 | Yuen et al. | 386/83 |
| 5,974,222 | A | 10/1999 | Yuen et al. | 386/83 |
| 6,014,184 | A | 1/2000 | Knee et al. | 348/731 |
| 6,040,829 | A | 3/2000 | Croy et al. | 345/327 |
| 6,130,726 | A | 10/2000 | Darbee et al. | 348/734 |
| 6,169,543 | B1 | 1/2001 | Wehmeyer | 345/327 |

(Continued)

OTHER PUBLICATIONS http://web.archive.org/web/19990417053752/http://shoutcast.com/, Apr. 17, 1999.*

(Continued)

*Primary Examiner*—Hunter B. Lonsberry
(74) *Attorney, Agent, or Firm*—Kory D. Christensen; Stoel Rives LLP

(57) ABSTRACT

An Internet-enabled television system provides an electronic program guide for the radio (radio EPG) depicting radio programs available via the Internet. The radio EPG displays the programming available for a plurality of radio stations and time slots. The radio EPG is interactive in that a user may select a radio program for immediate playback or future recording. Radio programs are continuously received and cached by the Internet-enabled television system such that a user may be able to select and listen to an earlier-broadcast radio program listed in the radio EPG.

20 Claims, 6 Drawing Sheets

U.S. PATENT DOCUMENTS

| | | | |
|---|---|---|---|
| 6,177,931 B1* | 1/2001 | Alexander et al. | 725/52 |
| 6,233,389 B1 | 5/2001 | Barton et al. | 386/46 |
| 6,434,621 B1* | 8/2002 | Pezzillo et al. | 709/231 |
| 6,642,939 B1* | 11/2003 | Vallone et al. | 715/721 |
| 6,658,231 B2 | 12/2003 | Nakatsuyama | 455/3.06 |
| 6,721,403 B1* | 4/2004 | Mandalia | 379/101.01 |
| 6,928,262 B1 | 8/2005 | Kanemitsu | 455/3.06 |
| 6,944,430 B2 | 9/2005 | Berstis | 455/186.1 |
| 2001/0047516 A1* | 11/2001 | Swain et al. | 725/86 |
| 2002/0015020 A1* | 2/2002 | Mobin | 345/156 |

OTHER PUBLICATIONS

Radio Spy, "Is your working environment bringing you down," pp. 2.

Radio Spy, "Gaming News," p. 1.

Computer Letter, Technological Partners, vol. 17, No. 5, Feb. 5, 2001, pp. 1-8.

DMX Music; DMX Music, Inc.; Copyright 1998-2000; pp. 1.

Kerbango Tuner; Kerbango, a division of 3Com Corporation; 2000; pp. 1-2.

OmniRemote™ Software; website http://www.pacificneotek.com/omnisw.htm; pp. 1-2.

RadioSpy; The Net Radio Resource; RadioSpy 1.1 Shareware Release ReadMe; pp. 1-4.

Office Action mailed Oct. 7, 2005. U.S. Appl. No. 09/851,528, filed May 5, 2001.

* cited by examiner

SYSTEM AND METHOD FOR DELIVERING RADIO PROGRAMS AND RELATED SCHEDULE INFORMATION

BACKGROUND

1. Field of the Invention

The present invention relates generally to electronic entertainment systems and methods. More specifically, the present invention relates to a system and method for delivering radio programs and related schedule information.

2. Description of Related Background Art

For many years, radio broadcasting has been an important medium for information delivery and entertainment. Each day, millions of people listen to a wide variety of radio programs, including music, news, sporting events, talk shows, and the like. In general, each locality has between 20 and 40 radio stations in the AM (amplitude modulated) and FM (frequency modulated) bands, providing a diversity of listening options.

Today, radio programs are being broadcast via the Internet. Radio signals are digitized, packetized, and transmitted to a receiver's computer or Internet-enabled television using standard protocols such as TCP/IP (transmission control protocol/Internet protocol). Various software programs are available for receiving and playing radio signals transmitted via the Internet, such as RealPlayer Plus®, available from RealNetworks, Inc. of Seattle, Wash.

Advantageously, Internet-based radio transmissions are not geographically limited. Thus, a local radio station in New York City may be received via the Internet at a user's home in Seattle or anywhere else in the world. It is now possible to choose from radio broadcasts from thousands of radio stations around the world via the Internet medium.

Recently, Internet and television technologies have begun to converge. Internet-enabled television systems, which allow a user to access the Internet via a television equipped with a special set top box (STB), are increasing in popularity. Thus, using an Internet-enabled television system, a user now has access to a large variety of radio stations in addition to conventional television programming.

Unfortunately, the great proliferation of available Internet-based radio stations can be more than a little confusing, and possibly somewhat daunting, for many listeners. Many people do not listen to interesting programming simply because they are not aware of it. Currently, radio program listings for multiple stations are not being stored in any centralized and easily-accessible medium.

Moreover, once a listener has missed a desired program, there is typically no way for the listener to hear it, aside from making a special request to a radio station. In order to record a program, a user must typically set up and use special equipment or software, the operation of which is often too complex for the average user.

Known methods of informing users of available radio programming schedules have proven to be deficient in a number of areas. Written programming guides, for example, require significant lead time to print and distribute. Consequently, programming changes that occur after printing are not reflected in the written programming guides. Additionally, a viewer must obtain a new programming guide periodically (e.g., weekly) in order to keep the written information current.

Many radio stations periodically announce what radio programs will be airing in the near future. However, if a person does not happen to be listening at the time of the announcement, he or she will not receive the schedule information. Additionally, the schedule information provided by such an announcement is typically applicable to only a small set of programs airing on the particular radio station.

In the case of packetized transmissions, i.e., those transmitted over a network such as the Internet, programming information available to listeners is similarly deficient. A few Internet-accessible radio stations provide information concerning the general content of radio broadcasts, e.g., "Classical Music," "Family Values Talk Radio," etc. Occasionally, a radio station may provide an indication of a specific artist, title, etc., for a single song being currently broadcast by the station. However, information concerning future broadcasts is generally not available. Additionally, there is no single resource for radio program schedule information pertaining to multiple Internet-accessible radio stations for past, present, and future radio programs.

Accordingly, there is a need for a system and method for providing radio programs and related schedule information to a listener that overcome the limitations of the prior art. Such a system and method should preferably provide information related to multiple stations for multiple time slots. Additionally, the system and method should preferably enable a user to easily select past, present, and future radio programs for recording and/or playback.

BRIEF DESCRIPTION OF THE DRAWINGS

Non-exhaustive embodiments of the invention are described with reference to the figures, in which.

DETAILED DESCRIPTION OF THE INVENTION

The present invention solves the foregoing problems and disadvantages by providing a system and method for delivering radio programs and related schedule information. A database of radio program schedule information is maintained for a plurality of Internet-accessible radio stations. A user's Internet-enabled television system retrieves the schedule information from the database and generates therefrom an electronic programming guide for radio ("radio EPG"). In one embodiment, the radio EPG graphically illustrates the programming for multiple radio stations and time slots in a grid format.

The radio EPG is interactive in that a user may select a radio program therefrom. If the selected radio program is being currently broadcast, the user's Internet-enabled television system receives the radio program from the Internet-accessible radio station and simultaneously plays it for the user. If the radio program is to be broadcast in the future, the user's Internet-enabled television system sets a recording task to record the radio program when it is subsequently broadcast by the radio station. If the radio program was broadcast in the past, the user's Internet-enabled television system determines whether the radio program was previously cached in response, for example, to a recording task, a user selection, or an ongoing program of caching radio programs in anticipation of user demand.

Thus, the present invention provides a centralized resource by which the user may obtain schedule information for a plurality of Internet-accessible radio stations for multiple time slots. The present invention also provides a mechanism for easy selection of a radio program for listening or recording.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, user selections, network transactions, database queries, database structures, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Figure 1:
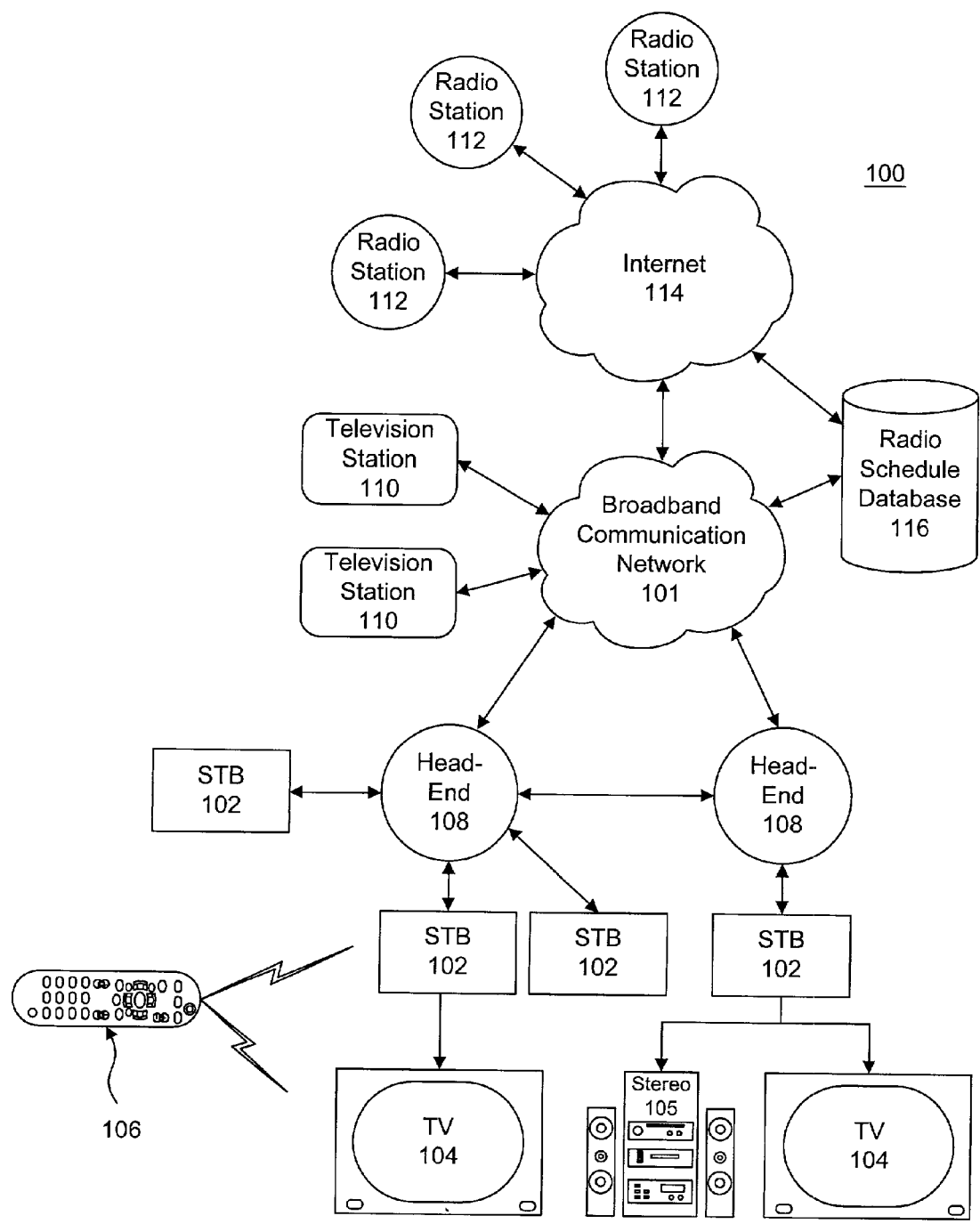
FIG. 1 is a block diagram of a system for delivering radio and television programs to a plurality of users.

Referring now to FIG. 1, there is shown a system 100 for delivering television programs and other forms of content, such as radio programs, to a plurality of customers. In one implementation, the system 100 includes a broadband communication network 101, such as a cable network. However, other networks are contemplated, one particular example of which is a satellite network.

In one configuration, the system 100 includes a plurality of set top boxes (STBs) 102 located, for instance, at customer homes. Generally, an STB 102 is a consumer electronics device that serves as a gateway between a customer's television and the network 101. In alternative embodiments, an STB 102 may be embodied as a personal computer, an advanced television set, or another type of client terminal. Thus, the invention should be construed as being limited to the field of Internet-enabled television systems.

In one embodiment, an STB 102 receives encoded television programs from the network 101 and decodes the same for display on a coupled television 104 or other display device (such as a computer monitor, flat panel display, projection screen, or the like). As its name implies, an STB 102 is typically located on top of, or in close proximity to, the television 104. The STB 102 may also be coupled to a stereo system 105, which may include, for instance, a stereo receiver, speakers, and other standard components for reproducing audio signals with a high degree of fidelity.

Each STB 102 may be distinguished from other network components by a unique identifier, number, code, or address, examples of which include an IP (Internet Protocol) address or media access control (MAC) address. Thus, video streams and other information may be transmitted from the network 101 to a specific STB 102 by specifying the corresponding address, after which the network 101 routes the transmission to its destination using conventional techniques.

A remote control 106 is provided, in one embodiment, for convenient remote operation of the STB 102 and the television 104. If desired, the remote control 106 may take the form of separate remote control devices for the STB 102 and the television 104. The remote control 106 may use infrared (IR), radio frequency (RF), or other wireless technologies to transmit control signals to the STB 102 and the television 104. Other remote control devices are also contemplated, such as wireless keyboards and webpads (not shown).

In one embodiment, each STB 102 is coupled to the network 101 via a head-end 108 or other distribution center. In the context of a cable network, a head-end 108 is generally a centrally-located facility where television programs are received from a local cable TV (CATV) satellite downlink or other source and packaged together for transmission to customer homes. In one configuration, a head-end 108 also functions as a Central Office (CO) in the telephone industry, routing video streams and other data to and from the various STBs 102 serviced thereby.

The network 101 is preferably coupled to one or more television stations 110, which provide television programming for distribution to the STBs 102. Additionally, the network 101 may be coupled to one or more radio stations 112 via the Internet 114. The Internet 114 is a "network of networks" and is well known to those skilled in the art. Communication over the Internet 114 is accomplished using standard protocols, such as TCP/IP (transmission control protocol/Internet protocol) and the like.

In one configuration, a radio schedule database 116 is coupled to one or both of the broadband communication network 101 and the Internet 114. The radio schedule database 116 preferably maintains schedule information for past, present, and future radio programs broadcast by a plurality of radio stations 112. Throughout the following disclosure, the term "broadcast" is not limited to electromagnetic transmissions, but contemplates packetized transmissions using a network, such as the Internet 114. The radio schedule database 116 may be implemented using any conventional relational or hierarchical database management system (DBMS) or the like.

In one implementation, the radio schedule database 116 receives radio program schedule information directly from the radio stations 112 via the Internet 114 using, for example, the hypertext transfer protocol (HTTP) or the file transfer protocol (FTP). In such an embodiment, updates of the database may be fully automated. However, in other embodiments, the radio program schedule information may be obtained from disks, CD-ROMS, or tapes, or may even be manually entered.

Figure 2:
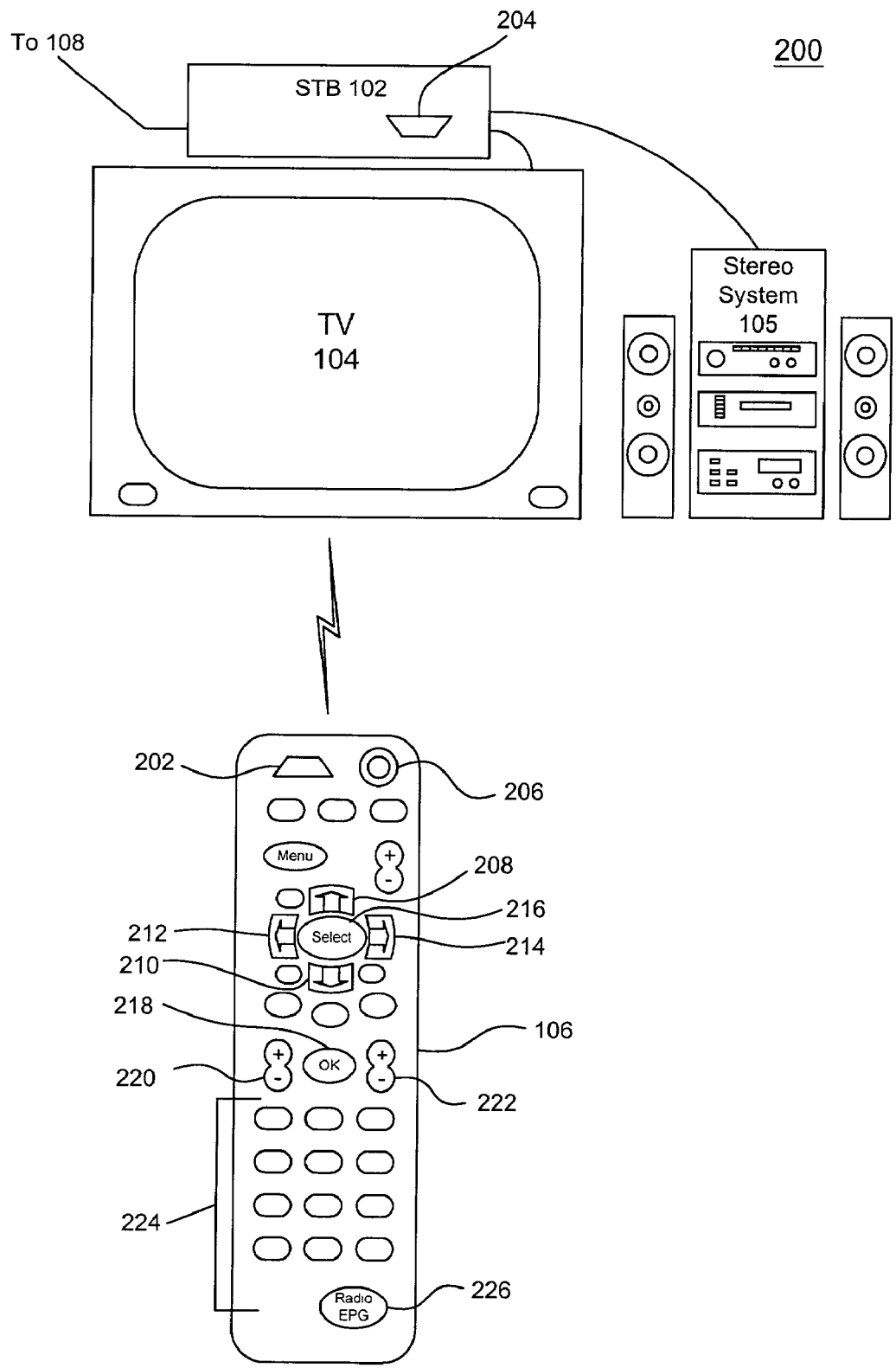
FIG. 2 is an illustration of an Internet-enabled television system including a remote control and a set top box.

Referring now to FIG. 2, there is shown an Internet-enabled television system 200 according to an embodiment of the invention. As depicted, the system 200 may include an STB 102, a television 104 (or other display device), and a remote control 106. The system 200 may optionally include a stereo system 105 for high-fidelity audio reproduction.

As noted, the remote control 106 is provided for convenient remote operation of the STB 102 and television 104. In certain embodiments, the remote control 106 may also be configured to operate the stereo system 105. Preferably, control signals are transmitted from a wireless transmitter 202 in the remote control 106 to a wireless receiver 204 in the STB 102 (television 104 and/or stereo system 105).

In the depicted embodiment, the remote control 106 includes a plurality of buttons or similar controls. For instance, the remote control 106 may include a power button 206, an up arrow button 208, a down arrow button 210, a left arrow button 212, a right arrow button 214, a "Select" button 216, an "OK" button 218, channel buttons 220, volume buttons 222, alphanumeric buttons 224, and a "Radio EPG"

button 226. The functions of certain of the above-identified buttons will be discussed in greater detail below.

Figure 3:
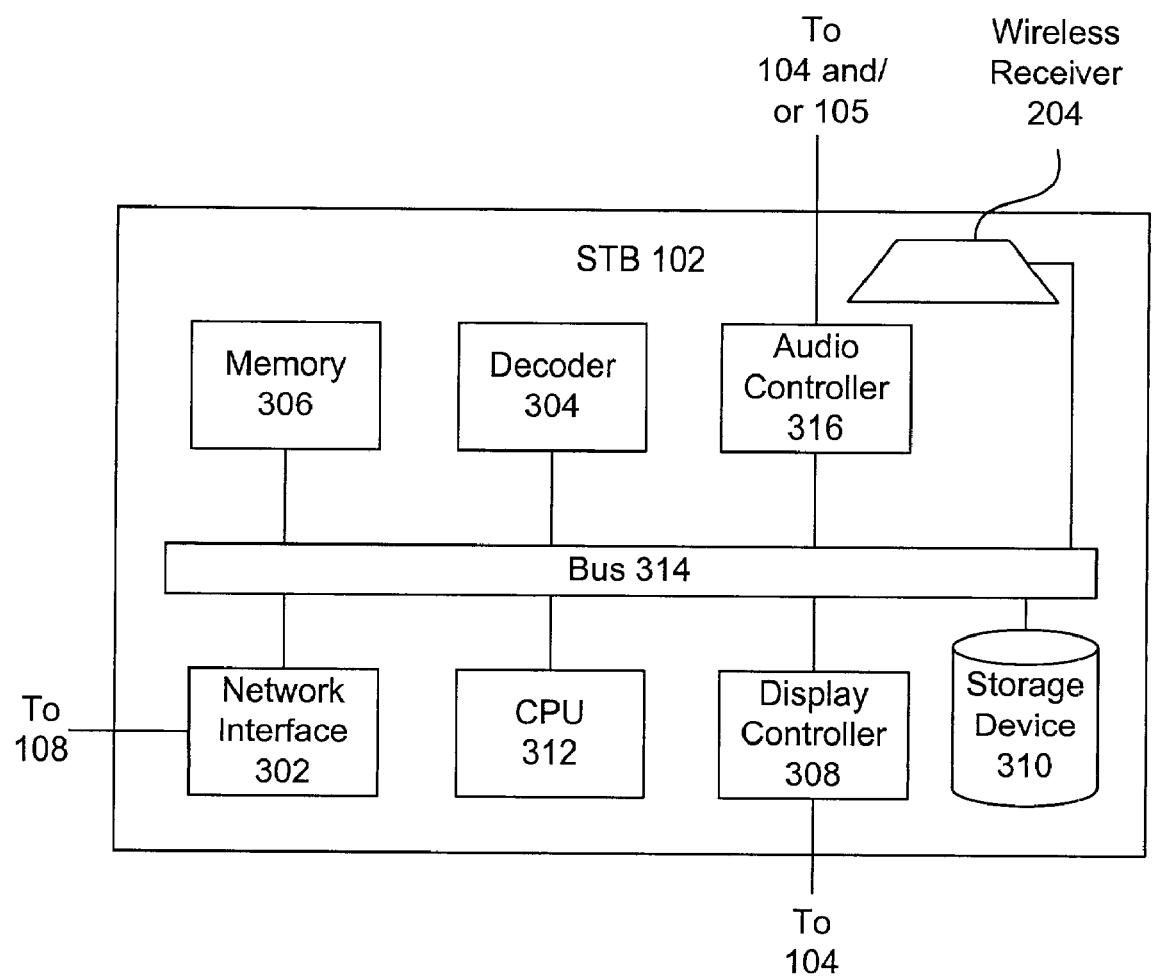
FIG. 3 is a detailed block diagram of a set top box.

Referring now to FIG. 3, there is shown a physical block diagram of an STB 102 according to one embodiment of the invention. As noted above, the STB 102 includes a wireless receiver 204 for receiving control signals sent by the wireless transmitter 202 in the remote control 106. In various embodiments, the receiver 204 may be configured to receive IR, microwave, VHF, UHF, or other electromagnetic frequencies.

The STB 102 also includes, in one implementation, a network interface 302 for communicating with the network 101 via the head-end 108. The interface 302 may include conventional tuning circuitry for receiving MPEG (Moving Picture Experts Group) packets for a selected television channel. The interface 302 may also include conventional cable modem circuitry for sending or receiving other types of data. For example, the interface 302 may conform to the DOCSIS (Data Over Cable Service Interface Specification) or DAVIC (Digital Audio-Visual Council) cable modem standards.

In one configuration, one or more frequency bands (for example, from 5 to 30 MHz) may be reserved for upstream transmission. Digital modulation (for example, quadrature amplitude modulation or vestigial sideband modulation) may be used to send digital signals in the upstream transmission. Of course, upstream transmission is accomplished differently for different networks 101. Alternative ways to accomplish upstream transmission include using a back channel transmission, which is typically sent via an analog telephone line, ISDN, DSL, or other techniques.

In one implementation, the STB 102 also includes a decoder 304, such as an MPEG decoder, for decoding packets received from the network 101. As depicted, the decoder 304 may be implemented as a hardware component. Alternatively, or in addition, software decoding may be used.

The STB 102 further includes a memory device 306, such as a random access memory (RAM), configured to store data for temporary use. Similarly, a read-only memory (ROM) may be provided for storing more permanent data, such as fixed code and configuration information.

In one embodiment, a display controller 308 is provided for converting decoded digital video information into analog signals for display on the television 104. In alternative embodiments, the display controller 308 may provide a direct, digital video output for televisions 104 equipped to receive the same. Preferably, the display controller 308 includes graphics hardware for performing bit-block transfers (bit-blits) and other graphical operations. Thus, the display controller 308 may be configured to display a user interface (UI) on the television 104.

In some implementations, the STB 102 may include a storage device 310, such as a hard disk drive or the like. The storage device 310 may be configured to record encoded television broadcasts and retrieve the broadcasts at a later time for decoding by the decoder 304 and display by the display controller 308.

The storage device 310 may also be used in various embodiments to store viewer preferences, parental lock settings, electronic programming guide (EPG) data, programming preferences, passwords, e-mail messages, information requests, and the like. In one implementation, the storage device 310 also stores an operating system (OS) for the STB 102, such as Windows CE® or Linux®.

A CPU 312 controls the operation of the STB 102, including the other components thereof, which are coupled to the CPU 312 via a bus 314. The CPU 312 may be embodied as a microprocessor, a microcontroller, a digital signal processor (DSP), application specific integrated circuit (ASIC), field programmable gate array (FPGA), or other device known in the art. As noted above, the CPU 312 may perform various operations based upon control signals generated by the remote control 106 and transmitted to the receiver 204.

In selected embodiments, an audio controller 316 is provided for converting decoded digital audio information into analog signals to be transmitted to the television 104 and/or stereo 105. In alternative embodiments, the audio controller 316 may provide a direct, digital audio output (e.g., AC-3) for televisions 104 and/or stereos 105 equipped to receive the same.

Of course, FIG. 3 illustrates only one possible configuration of an STB 102. Those skilled in the art will recognize that various other architectures and components may be provided within the scope of the invention. In addition, various standard components of typical STB 102 are not illustrated in order to avoid obscuring aspects of the invention.

Figure 4:
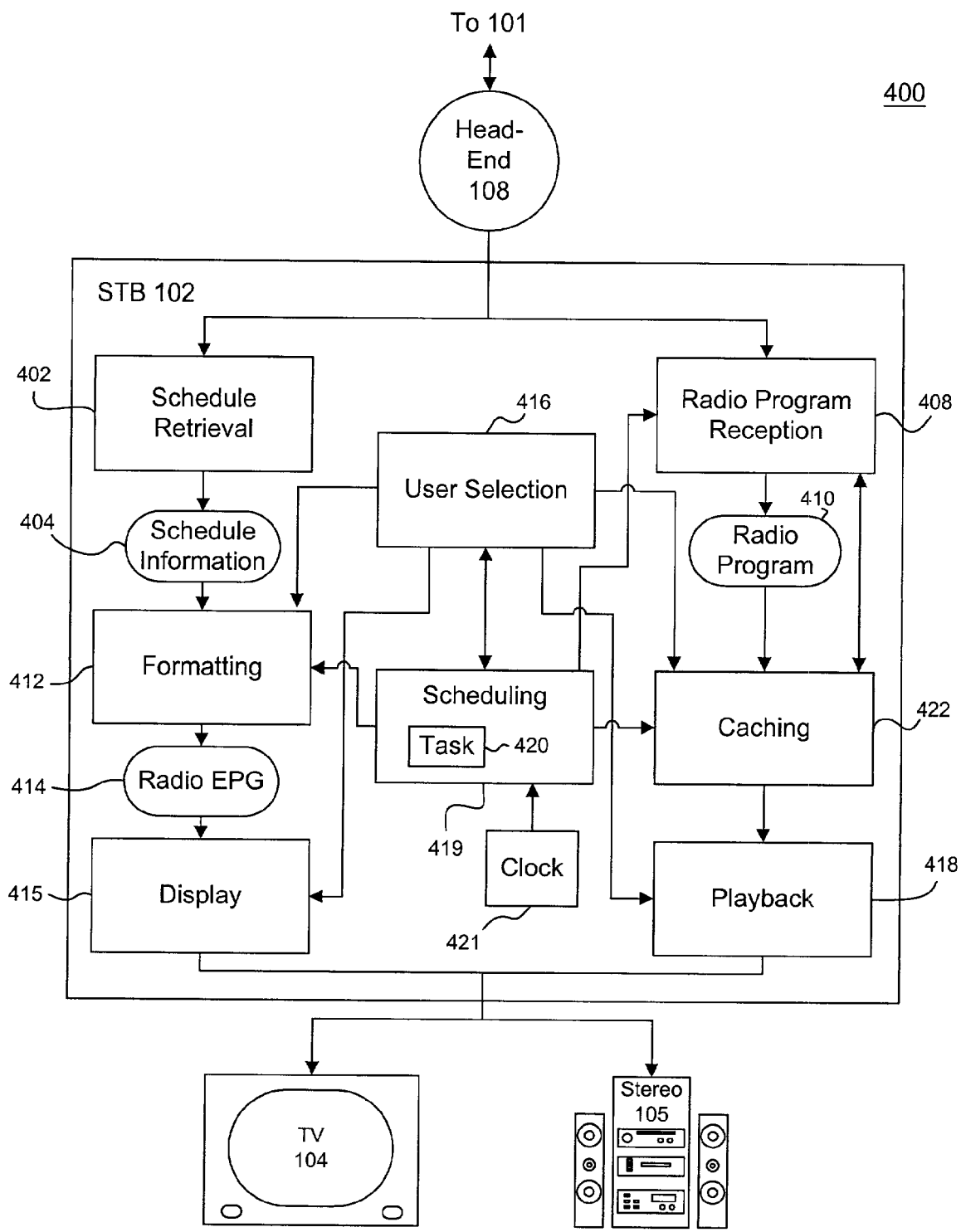
FIG. 4 is a block diagram of logical components of a system and method for delivering radio programs and related schedule information.

FIG. 4 is a block diagram of logical components of a system 400 for delivering radio programs and related schedule information. The depicted logical components may be implemented using one or more of the physical components shown in FIG. 3. Additionally, or in the alternative, various logical components may be implemented as software modules stored in the memory 306 and/or storage device 310 and executed by the CPU 312.

In the depicted embodiment, a schedule retrieval component 402 retrieves radio program schedule information 404 from the database 116 shown in FIG. 1. The schedule information 404 may be retrieved upon demand, e.g., when requested by the user, or at periodic intervals. The schedule retrieval component 402 may include a client program for accessing the particular DBMS or server associated with the database 116. In one embodiment, the schedule retrieval component 402 issues a request to the database 116 and receives in response the schedule information 404. In one embodiment, the retrieved schedule information 404 is cached within the memory 306 or the storage device 310 of the STB 102.

The format of the radio program schedule information 404 is not crucial to the invention. The information 404 may be stored, for instance, within one or more tables of a relational database, within an XML (extensible Markup Language) document, within a delimited text document, or the like.

The schedule retrieval component 402 may only retrieve a subset of the information 404 available in the database 116. For example, the schedule retrieval component 402 may only retrieve the current day's schedule information 404 for the user's favorite radio stations 112 (which may be specified by the user or determined from historical user selections). However, the user may request retrieval of more comprehensive schedule information 404, if desired.

In one configuration, a radio program reception component 408 receives one or more radio programs 410 from a radio station 112 via the Internet 114. In the context of the present invention, a radio station 112 need not actually broadcast radio frequency electromagnetic signals. For example, a number of "Internet-only" radio stations 112 exist, which are only accessible via the Internet 114.

Various software tools are known for receiving digitally-encoded and packetized radio programs 410, one particular example of which is RealPlayer Plus®, available from RealNetworks, Inc. of Seattle, Wash. In alternative embodiments, however, the radio program reception component 408 may be implemented in hardware or firmware.

The schedule retrieval component 402 and the radio program reception component 408 may utilize, for example, the network interface 302 of FIG. 3 to receive a packet stream containing the radio program 410 from a head-end 108. The radio program 410 may be encoded in a variety of formats, such as MPEG, or any other known compressed or uncompressed digital format. The decoder 304 and/or CPU 312 of FIG. 3 decode the transmission, if necessary.

Preferably, the radio program reception component 408 is capable of simultaneously receiving a plurality of radio programs 410 from different radio stations 112. The maximum number of radio programs 410 that can be simultaneously received is primarily limited by the bandwidth of the STB's 102 connection to the Internet 114. In the case of a broadband communication network 101, the bandwidth is relatively high, allowing for simultaneous retrieval of a large number of radio programs 410.

Figure 5:
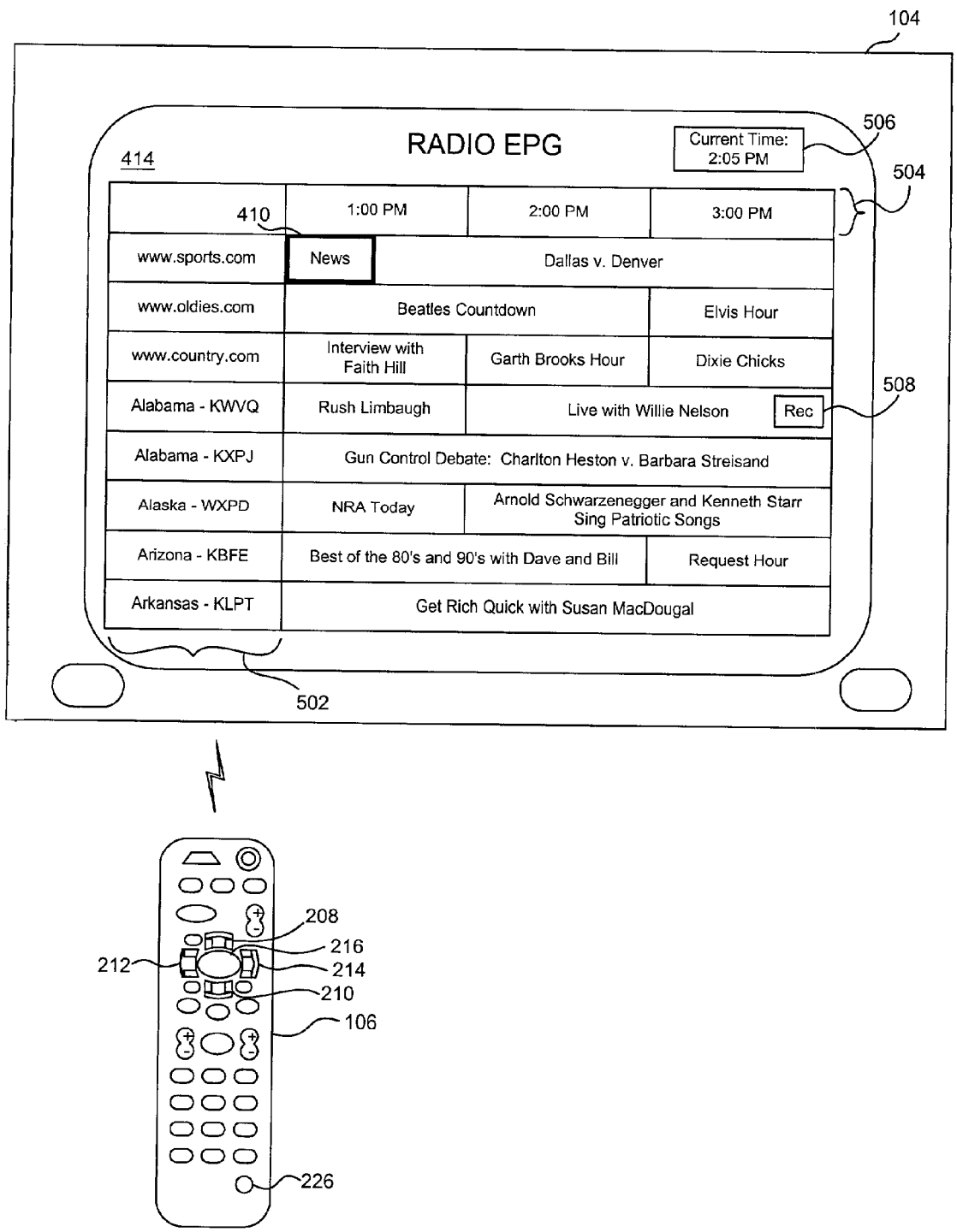
FIG. 5 is an exemplary electronic programming guide (EPG) for radio.

In one embodiment, a formatting component 412 arranges the raw schedule information 404 into a suitable format for display to the user. As described in greater detail below, the formatting component 412 may arrange the schedule information 404 into an electronic programming guide for radio ("radio EPG") 414, an example of which is shown in FIG. 5. In the depicted embodiment, the radio EPG 414 includes a grid with separate axes for radio stations 112 and time slots. Rectangular elements within the radio EPG 414 correspond to individual radio programs 410.

A display component 415 receives the formatted radio EPG 414 from the formatting component 412 and displays the same on the television 104. In certain embodiments, the display component 415 may be configured to display a television program simultaneously with the radio EPG 414, for example, by splitting the television screen between the television program and the radio EPG 414.

In one implementation, the radio EPG 414 is interactive in that a user selection component 416 allows a user to select a radio program 410 from the radio EPG 414. As shown in FIG. 5, the user may employ the up, down, left, and right buttons 208, 210, 212, 214 of the remote control 106 to highlight a desired radio program 410, e.g. "News." Thereafter, the user may indicate a selection of the radio program 410 by pressing, for example, the "Select" button 216 on the remote control 106.

In alternative embodiments, a radio program 410 may be selected from a menu or list. In still other embodiments, a user may type the name of a desired radio program 410, after which the user selection component 416 searches the radio EPG 414 for a matching radio program 410.

In one implementation, the actions performed by the user selection component 416 in response to a selection of a radio program 410 depend on whether the selected radio program 410 (1) is being currently broadcast, (2) will be broadcast in the future, or (3) was previously broadcast by the radio station 112 (e.g., at an earlier time).

For example, if the user selects radio program 410 being currently broadcast (e.g. the current time falls within the time slot of the selected radio program 410), the user selection component 416 instructs the radio program reception component 408 to receive the selected radio program 410 from the radio station 112. Thereafter, the user selection component 416 instructs a playback component 418 to immediately begin playing the radio program 410 as it is received by the radio program reception component 408. In one implementation, the playback component 418 utilizes the audio controller 316 of FIG. 3 to output the radio program 410 to either the television 104, the stereo system 105, or both.

If, however, the user selects a future radio program 410 from the radio EPG 414 (e.g., having a starting time later than the current time), the user selection component 416 instructs a scheduling component 419 to schedule a recording task 420 to record the selected radio program 410 when it is broadcast by the radio station 112. In one embodiment, a recording task 420 includes an indication of the radio station 112, the starting time, and the ending time for the selected radio program 410.

The user selection component 416 and the scheduling component 419 may receive an indication of the current time of day from a clock 421. The clock 421 may be configured to periodically synchronize itself using timing signals received with television broadcasts or using time/date servers on the Internet 114.

One or more recording tasks 420 may be stored by the scheduling component 419 within the storage device 310 or the memory 306 of the STB 102. When the starting time for the selected radio program 410 arrives (as indicated by the clock 421), the scheduling component 419 signals the radio program reception component 408 to receive the radio program 410. Thereafter, a caching component 422 stores the radio program 410 within the storage device 310 or the memory 306 of the STB 102. Later, the user may listen to the cached radio program 410, by issuing a command, for example, using the remote control 106.

The user may also select a previously-broadcast radio program 410 from the radio EPG 414 (e.g., having an ending time before the current time). Conventionally, a user would be unable to listen to a radio program 410 that he or she failed to record.

However, in accordance with the present invention, the user selection component 416 queries the caching component 422 to determine whether the requested program 410 has been cached. In one implementation, the radio program reception component 408 and the caching component 422 carry out an ongoing program of continuously receiving radio programs 410 from different radio stations 112 without a specific user request. Which radio programs 410 are received may be based upon specified user preferences (e.g., favorite radio stations 112) or observed user selections over time For example, where a user typically listens to broadcasts from a particular radio station 112, or of a particular genre, the radio program reception component 408 may receive radio programs 410 broadcast by that station 112 or of that genre in anticipation of user demand. In some cases, the caching component 422 may cache all of the programming broadcast by a particular radio station 112 for a period of time. In one embodiment, the selection of which radio programs 410 are received is made by the caching component 422. Alternatively, the radio program reception component 408 is used for this purpose.

Radio programs 410 received by the radio reception component 408 are preferably cached by the caching component 422, either within the storage device 310 or the memory 306 of the STB 102. Thus, if the user selects previously-broadcast radio program 410 that was cached, the caching component 422 may retrieve the radio program 410 from the storage device 310 or the memory 306 and provide the same to the playback component 418 for playback to the user.

Of course, not every radio program 410 may be feasibly cached, since the bandwidth of the STB's 102 Internet connection is probably not sufficient to simultaneously download all of the possible radio programs 410 from all of the possible radio stations 112. Thus, if a requested radio program 410 was not cached, the user is notified accordingly. However, by paying close attention to historical user selections, and by relying on stated user preferences, the caching component 422 will typically be able to anticipate a user interest in a majority of radio programs 410 and make them available for subsequent playback.

In alternative embodiments, the caching component 422 need not be located within the STB 102, as shown in FIG. 4, but may be located upstream of the STB 102, such as within the head-end 108 or another location within the network 101. Thus, a storage device 310 within the head-end 108, for example, may be used to selectively cache radio programs 410 for a plurality of STBs 102. Locating the caching component 422 at the head-end 108 is advantageous in that a radio program 410, once cached, is available for download by a plurality of users. Moreover, a head-end based caching component 422 may better anticipate user demand based upon the selections more than one user.

In one embodiment, the user selection component 416 is in communication with the formatting component 412 and allows the user to change the displayed format of the radio EPG 414. For example, the user may specify the number of rows and columns corresponding to radio stations 112 and time slots. Likewise, the user may specify whether the rows and columns correspond to radio stations 112 and time slots, or vice versa.

Similarly, the user selection component 416 preferably allows the user to scroll the radio EPG 414 horizontally to display, for example, additional radio stations 112, or vertically to display, for example, additional time slots. The scroll function may be controlled by various buttons on the remote control 106, such as the up, down, left, and right arrow buttons 208, 210, 212, 214.

In one embodiment, the user selection component 416 also allows a user to filter the list of radio stations 112 displayed in the radio EPG 414. For example, the user may request that only radio stations 112 from a particular state or locality be displayed. Likewise, the user may request that only radio stations of a particular genre (news, sports, country music, etc.) be displayed.

Referring to FIG. 5, an exemplary radio EPG 414 is depicted on a display screen of the television 104. As noted above, the radio EPG 414 preferably lists the radio programming available for a plurality of radio stations 112 and a plurality of time slots. Additionally, the radio EPG 414 preferably provides a mechanism by which a user can select a desired program 410 for immediate playback or future recording.

In one implementation, the radio EPG 414 is displayed on the television 104 in response to a user pressing a specifically-designated button on the remote control 106, e.g. a "Radio EPG" button 226. Alternatively, the radio EPG 414 may be displayed in response to selection of menu item or control (not shown) displayed on the television 104.

As depicted, the radio EPG 414 may be embodied as a grid, with rows corresponding to radio stations 112 and columns corresponding to time slots. In an alternative embodiment, the rows may correspond to time slots and the columns may correspond to radio stations 112. Each element of the grid preferably corresponds to a radio program 410. A radio program 410 may comprise an individual song, a music "set," a program by a particular DJ, a radio talk show, a sporting event, etc.

The elements need not be equal in length because the radio programs 410 are not equal in length. Additionally, the elements need not be precisely aligned with the time slots columns because the radio programs 410 may not begin on the hour, or on the half hour, but may begin and end at odd times.

In the depicted embodiment, the first element 502 of each row (or column) of the radio EPG 414 identifies the specific radio station 112 associated with that row (or column). The identification of the radio station 112 may include, for instance, an indication of the state and/or city in which the radio station 112 is located (e.g., Alabama), the "call" letters of the radio station 112 (e.g., KXPJ), an indication of the overall genre of the radio station 112 (e.g., rock or country), or the like. In the case of an Internet-only radio station 112, a domain name or URL may be provided (e.g., www.oldies.com). The elements 502 form a column (or row) which may be arranged in any suitable order, such as alphabetically by state, alphabetically by city, in order of popularity, etc.

Likewise, in the depicted embodiment, the first element 504 of each column (or row) identifies a time slot. In various embodiments, the time slot may correspond to a different period of time, e.g. an hour, a half hour, a quarter hour, etc. Preferably, the elements 504 are arranged along a row (or column) in chronological order.

In one embodiment, the first time slot displayed in the radio EPG 414 corresponds to the current time slot (e.g., includes the current time 506). Alternatively, as shown in FIG. 5, the first time slot may correspond to the previous time slot (e.g., the time slot before the one including the current time 506).

Preferably, a recording indicator 508 is displayed in connection with a radio program 410 that has been scheduled for recording. The recording indicator 508 may be embodied as an icon or the like. Alternatively, a radio program 410 marked for recording may be highlighted or designated by a particular color.

Figure 6:
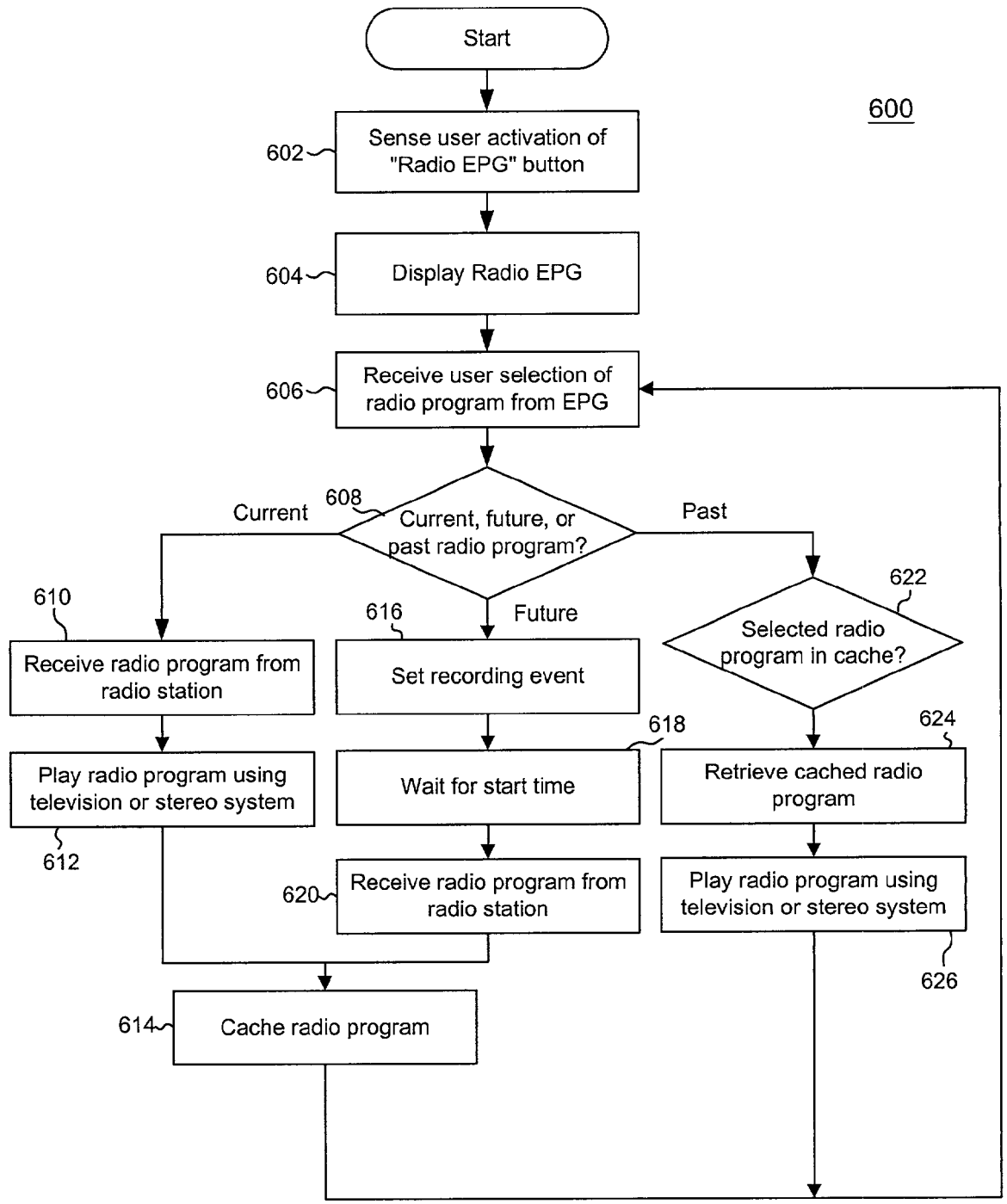
FIG. 6 is a flowchart of a method of delivering radio programs and related schedule information to a user.

Referring now to FIG. 6, there is shown a flowchart of a method 600 for delivering radio programs 410 and related schedule information 404. The method 600 begins by sensing 602 a user's activation of a specifically-designated button on a remote control 106, such as a "Radio EPG" button 226. Thereafter, a radio EPG 414 is displayed on the television 104, as shown in FIG. 5.

A user's selection of a radio program 410 from the radio EPG 414 is then received. A determination 608 is made as to whether the selected radio program 410 is being currently broadcast (e.g., the current time is within the time slot of the radio program 410), will be broadcast in the future (e.g., the starting time of the radio program 410 is after the current time), or has already been broadcast (e.g., the ending time of the radio program 410 is before the current time).

If the radio program 410 is being currently broadcast, the method 600 continues by receiving 610 the radio program 410 from the radio station 112 specified in the radio EPG 414. Thereafter, the radio program 410 is played 612 using the television 104 and/or the stereo system 105. In addition, the radio program 410 is preferably cached 614 within the storage device 310 or the memory 306 of the STB 102. In one embodiment, the receiving 610, playing 612, and caching 614 steps are performed in parallel, such that a user may listen to the radio program 410 as it is being received and stored.

If, however, the radio program 410 is to be broadcast in the future, the method 600 continues by scheduling 616 a recording task 420 to record the radio program 410 when it is actually broadcast by the radio station 112. The method 600 waits 618 until the start time specified in the recording task 420, at which time the radio program 410 is received 620 and cached 614.

If, however, the selected radio program 410 was previously broadcast, a determination 622 is made whether the selected radio program 410 has been cached by the caching component 422 (either in response to a user selection, a recording task 420, or an ongoing program of caching to anticipate user demand). If so, the cached radio program 410 is retrieved 624 from storage. Thereafter, the radio program 410 is played 626 using the television 104 or stereo system 105. After either of steps 614 or 626, the method returns to step 606 to receive another user selection of a radio program 410 from the radio EPG 414.

Based on the foregoing, the present invention offers numerous advantages not available in conventional approaches. For example, the present invention provides a user with a centralized resource of radio program schedule information 404 for a plurality of radio stations 112 and time slots in the form of a radio EPG 414. A user may easily select a radio program 410 from the radio EPG 414 for immediate listening or future recording. Moreover, the user may be able to selectively listen to a previously-broadcast radio program 410 from the radio EPG 414, assuming it was cached by the caching component 422.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

I claim:

1. A method for delivering radio programs and related schedule information using an Internet-enabled television system, the method comprising:
retrieving schedule information at a customer's Internet-enabled television system pertaining to radio programs being broadcast by a plurality of Internet-accessible radio stations;
automatically caching all of the radio programs being contiguously broadcast by a first radio station during a period of time;
formatting the schedule information into an interactive schedule guide including listings of previously broadcast and cached radio programs, wherein the interactive program guide includes listings of current and future radio programs in a same interface with the listings of the previously broadcast and cached radio programs;
displaying the interactive schedule guide on a television associated with the customer's Internet-enabled television system; and
allowing the customer to select one of the cached radio programs listed in the interactive schedule guide, such that the customer may listen to any of the radio programs contiguously broadcast during the period of time by the first radio station.

2. The method of claim 1, wherein the schedule information is retrieved from a remote database.

3. The method of claim 1, further comprising:
storing the schedule information within the customer's Internet-enabled television system.

4. The method of claim 1, wherein the interactive schedule guide is displayed on the television in response to a customer activating a specifically-designated button on a remote control device for the Internet-enabled television system.

5. The method of claim 1, wherein at least one element of the interactive schedule guide displayed on the customer's television corresponds to a radio program to be broadcast in the future over the Internet.

6. The method of claim 5, further comprising:
receiving a customer selection of an element corresponding to a radio program to be broadcast in the future;
scheduling a task within the customer's Internet-enabled television system to receive and cache the selected radio program at a time indicated by the interactive schedule guide.

7. The method of claim 6, further comprising:
visually indicating within the interactive schedule guide that a task has been scheduled for receiving the selected radio program.

8. The method of claim 1, wherein the automatic caching of radio programs is performed within a cable head-end.

9. A system for delivering radio programs and related schedule information comprising:
a schedule retrieval component configured to retrieve, at a customer's Internet-enabled television system, schedule information pertaining to radio programs being broadcast by a plurality of Internet-accessible radio stations;
a caching component for automatically caching all of the radio programs being contiguously broadcast by a first radio station during a period of time, wherein the caching component is located within a cable head-end;
a formatting component configured to format the schedule information into an interactive schedule guide including listings of previously broadcast and cached radio programs; and
a display component configured to show the interactive schedule guide on a television associated with the customer's Internet-enabled television system to allow the customer to select one of the cached radio programs listed in the interactive schedule guide, such that the customer may listen to any of the radio programs contiguously broadcast during the period of time by the first radio station.

10. The system of claim 9, wherein the schedule information is retrieved from a remote database.

11. The system of claim 9, wherein the caching component is further configured to cache the radio program schedule information within the customer's Internet-enabled television system.

12. The system of claim 9, wherein the interactive schedule guide is displayed on the television in response to a customer activating a specifically-designated button on a remote control device for the Internet-enabled television system.

13. The system of claim 10, wherein at least one element of the interactive schedule guide displayed on the customer's television corresponds to a radio program to be broadcast in the future over the Internet.

14. The system of claim 13, further comprising:
a customer selection component configured to receive a customer selection of an element corresponding to a radio program to be broadcast in the future;
a scheduling component configured to schedule a task within the customer's Internet-enabled television system to receive the selected radio program at a time indicated by the interactive schedule guide; and a radio program reception component configured to receive the selected radio program, wherein the caching component is further configured to cache the selected radio program within the customer's Internet-enabled television system in response to the selected radio program being received.

15. The system of claim 14, wherein the formatting component is further configured to visually indicate within the interactive schedule guide that a task has been scheduled for receiving the selected radio program.

16. The system of claim 9, wherein the interactive program guide includes listings of current and future radio programs in the same interface with the listings of the previously broadcast and cached radio programs.

17. A method for delivering radio programs and related schedule information using an Internet-enabled television system, the method comprising:

retrieving schedule information at a customer's Internet-enabled television system pertaining to radio programs being broadcast by a plurality of Internet-accessible radio stations;

automatically caching all of the radio programs being contiguously broadcast by a first radio station during a period of time, wherein the automatic caching of radio programs is performed within a cable head-end;

formatting the schedule information into an interactive schedule guide including listings of previously broadcast and cached radio programs;

displaying the interactive schedule guide on a television associated with the customer's Internet-enabled television system; and allowing the customer to select one of the cached radio programs listed in the interactive schedule guide, such that the customer may listen to any of the radio programs contiguously broadcast during the period of time by the first radio station.

18. The method of claim 17, wherein the interactive program guide includes listings of current and future radio programs in the same interface with the listings of the previously broadcast and cached radio programs.

19. A system for delivering radio programs and related schedule information comprising:

a schedule retrieval component configured to retrieve, at a customer's Internet-enabled television system, schedule information pertaining to radio programs being broadcast by a plurality of Internet-accessible radio stations;

a caching component for automatically caching all of the radio programs being contiguously broadcast by a first radio station during a period of time;

a formatting component configured to format the schedule information into an interactive schedule guide including listings of previously broadcast and cached radio programs, wherein the interactive program guide includes listings of current and future radio programs in a same interface with the listings of the previously broadcast and cached radio programs; and a display component configured to show the interactive schedule guide on a television associated with the customer's Internet-enabled television system to allow the customer to select one of the cached radio programs listed in the interactive schedule guide, such that the customer may listen to any of the radio programs contiguously broadcast during the period of time by the first radio station.

20. The system of claim 19, wherein the caching component is located within a cable head-end.

* * * * *